United States Patent
Dutch et al.

(10) Patent No.: US 9,769,007 B1
(45) Date of Patent: Sep. 19, 2017

(54) PASSIVE DATA PROTECTION SYSTEM MIGRATION

(71) Applicant: EMC Corporation, Hopkinton, MA (US)

(72) Inventors: Michael John Dutch, Saratoga, CA (US); Christopher Hercules Claudatos, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 178 days.

(21) Appl. No.: 14/035,364

(22) Filed: Sep. 24, 2013

(51) Int. Cl.
- *G06F 15/16* (2006.01)
- *H04L 29/06* (2006.01)
- *H04L 29/08* (2006.01)
- *G06F 12/00* (2006.01)

(52) U.S. Cl.
CPC .. *H04L 29/06047* (2013.01); *H04L 29/08072* (2013.01)

(58) Field of Classification Search
CPC ......... G06F 17/30091; G06F 17/30442; G06F 17/3056; G06F 17/30194; G06F 17/3048; G06F 17/30557; G06F 9/46; H04L 41/0823; H04L 41/5025; H04L 47/70; H04L 47/782; H04L 67/125; H04L 63/029; H04L 65/4084; H04L 67/02; H04L 67/06

USPC .................. 709/203, 223–229, 250
See application file for complete search history.

(56) References Cited

U.S. PATENT DOCUMENTS

| | | | |
|---|---|---|---|
| 8,151,360 B1* | 4/2012 | Kishore et al. ................. 726/28 |
| 2008/0091895 A1* | 4/2008 | Chen ................... G06F 12/0866 711/162 |
| 2008/0133695 A1* | 6/2008 | Suzuki ............... G06F 11/2074 709/216 |
| 2011/0149737 A1* | 6/2011 | Muthiah ............... G06F 9/5011 370/235 |
| 2012/0084262 A1* | 4/2012 | Dwarampudi et al. ....... 707/667 |
| 2013/0262801 A1* | 10/2013 | Sancheti et al. ............. 711/162 |
| 2013/0282662 A1* | 10/2013 | Kumarasamy et al. ...... 707/649 |
| 2013/0291070 A1* | 10/2013 | Triantafillou et al. ........... 726/4 |
| 2013/0339298 A1* | 12/2013 | Muller et al. ................. 707/640 |
| 2014/0181443 A1* | 6/2014 | Kottomtharayil et al. ... 711/162 |
| 2014/0304352 A1* | 10/2014 | Chaudhary ......... H04L 67/1029 709/208 |
| 2015/0019488 A1* | 1/2015 | Higginson et al. ........... 707/634 |
| 2015/0058449 A1* | 2/2015 | Garg ..................... H04L 67/10 709/219 |

* cited by examiner

*Primary Examiner* — Zarni Maung
(74) *Attorney, Agent, or Firm* — Peter Jovanovic; Theodore A. Chen; Krishnendu Gupta

(57) ABSTRACT

A method, article of manufacture, and apparatus for passively migrating a consumer from a legacy backup management system to a modern backup management system is discussed. A new hardware device may virally deploy the backup software throughout the consumer system. If the consumer decides the new backup system is performing optimally, it may disable the legacy system.

14 Claims, 4 Drawing Sheets

PASSIVE DATA PROTECTION SYSTEM MIGRATION

FIELD OF THE INVENTION

This invention relates generally to data protection systems, and more particularly to systems and methods for passively migrating from a legacy data protection system to a new one.

BACKGROUND OF THE INVENTION

General purpose computers perform a significant role in most people's personal and professional lives. At home, a general purpose computer may manage an individual's family photos, financial records, and person media, among other things. At work, the professional's computer may contain important documents and files related to his work activity. Whether at work or at home, loss of information residing on a general purpose computer may have a devastating effect on its owner.

Data protection systems may be used to backup general purpose computer systems to a backup location. This backup location may be a backup server in the office, an external hard drive, and/or the public and/or private cloud. In the event of a disaster resulting in loss of data on a general purpose computer, these backup locations may be used to restore any lost information.

There is a need, therefore, for an improved method, system, and apparatus for data protection systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
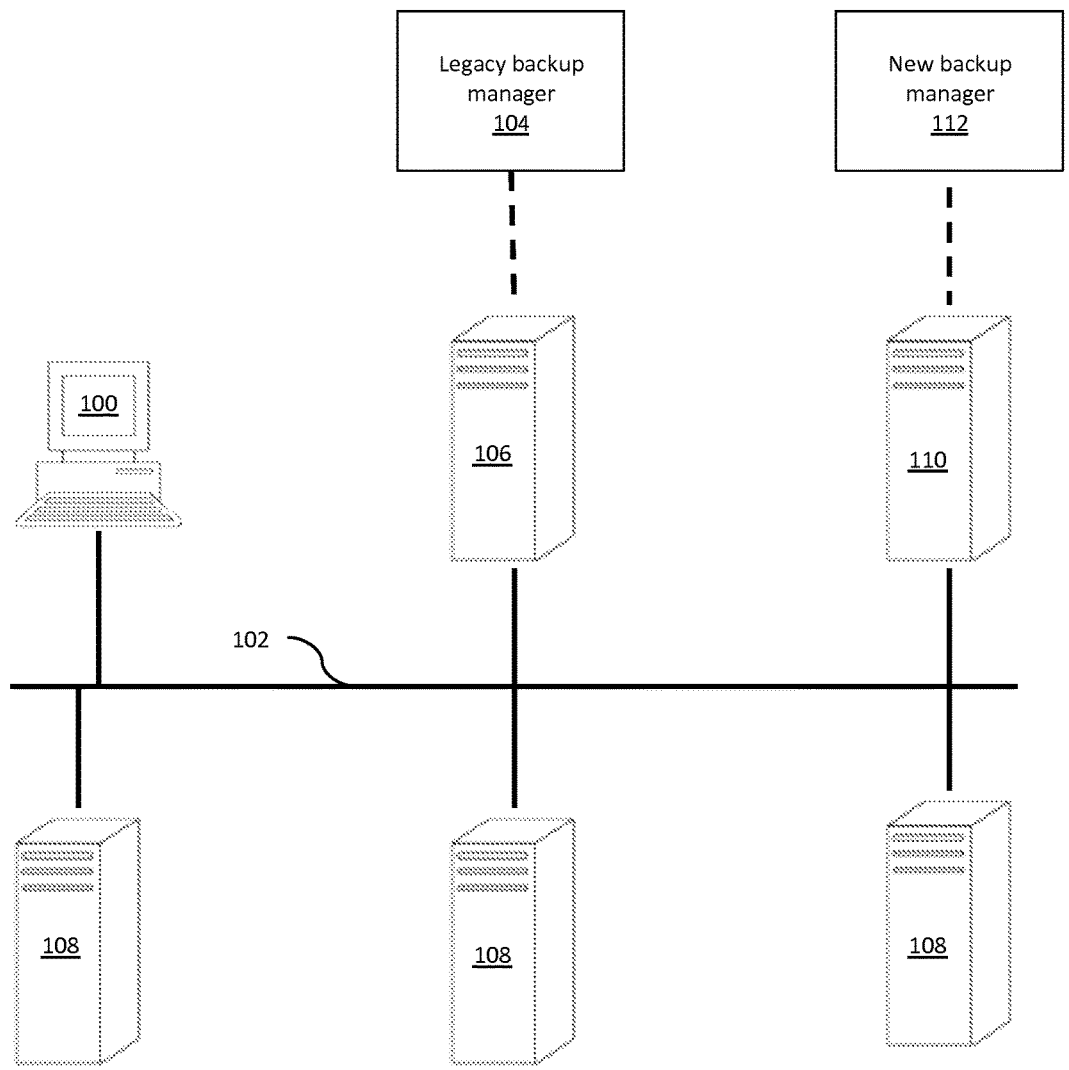
FIG. 1 illustrates an architecture for passive data protection tool migration consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The method, processes, and systems discussed herein provide a mechanism for passively migrating from a legacy data protection solution, such as a backup management solution, to a newer one. Consumers are often reluctant to upgrade or change their data protection system, even though their legacy system may be several years or even decades old. The learning curve associated with a newer system may be deemed too costly, even if there are significant savings in the long term. Additionally, there may be compatibility issues when a new system attempts to access backups stored by a legacy system. These compatibility issues may be further compounded if the legacy system stores data using a proprietary data format. The following system attempts to alleviate some of these concerns, and provides a system that passively migrates a consumer from a legacy system to a new, modern data protection system.

Turning now to FIG. 1, a system consistent with an embodiment of the present disclosure is discussed. The system may include one or more clients 100 in communication with network 102. Clients 100 may be, for example, servers, desktop, laptop, or mobile computers in a corporate environment. Similarly, network 102 may be a corporate intranet and/or a virtual or physical network accessible through a wired, wireless, and/or VPN connection. Clients 100 may include or have access to information that needs to be protected, such as by performing a backup over network 102. In some embodiments, the information may be stored on either an internal or external storage device.

Legacy data protection system 104 may be a computer application operating on computer server 106 and coordinating data protection tasks, such as backups from client 100. In some embodiments, legacy data protection system may communicate with data protection processes executing on client 100 over network 102. Legacy data protection system may control the flow of the data from client 100 and store it in a backup repository, which may reside on computer server 106. Additionally or alternatively, the repository may reside on any of the additional computer servers 108. In some embodiments, the repository may reside on an external storage devices, such as network attached storage ("NAS").

In an embodiment, legacy data protection system 104 may be an old, outdated, obsolete system. This system may be several years or decades old, and may not be designed for modern day computer usage. The consumer who owns the system, however, may be reluctant to upgrade or switch to a newer system for the reasons discussed above. Despite these obstacles, however, the consumer will likely need to eventually install additional hardware as backup sizes grow or as other data protection processes consume resources. For example, a repository storing backups managed by legacy data protection system 104 may eventually run out of space, and new storage will be added. This new storage or other hardware may present an opportunity to passively migrate the consumer from the legacy data protection system to a new data protection system.

In an embodiment, additional data repository 110 may be connected to network 102. Data repository 110 may be configured to provide additional storage, memory, and/or processing power to legacy data protection system 104. In some embodiments, legacy data protection system 104 may be configured to store the backups in a plurality of different backup repository types. A competitor to legacy data protection system 104 could, for example, produce repository 110. Additionally or alternatively, the developer of legacy data protection system 104 may provide repository 110.

Repository 110 may come pre-loaded with new data protection system 112. Data protection system 112 may be a newer or different data protection system than legacy backup system 104. Data protection system 112 may be any software solution configured to protect data on a client device, and in some embodiments is a backup manger. Data protection system 112 may comprise one or more data protection services, such as a cataloging service for cataloging backups, a scheduling service for scheduling backups, and/or a reporting service. In an embodiment, data protection system 112 may be able to see all the data stored in repository 110 since it is operating in the same system. Further, data protection system 112 may comprise all or a portion of the data protection system the consumer will migrate to from legacy data protection system 104.

Since data protection system 112 has visibility into repository 110, it may run tests or simulations over the data entering, stored on, or leaving the system. Data protection system 112, or another computer process, may use this data to provide reports to the consumer and/or producer of repository 110. These reports may be compared to similar reports generated for legacy data protection system 104, and may thereafter be used to justify the cost of migrating away from legacy data protection system 104. In some embodiments these reports may include data throughput, efficiency of data compression, and/or efficiency of data deduplication.

In some embodiments, new data protection system 112 may not be used as a fully functional data protection system, but may instead be used as a simulator. For example, new data protection system 112 may simulate the operation of a data protection system and repository without actually performing the tasks. Reports may thereafter be generated from the results of the simulation. Operating a simulator may be preferable, for example, if compute and/or memory resources are limited. Once the reports are generated, they may be used to convince a consumer that the costs of updating to the actual functioning data protection system are justified.

Data protection system 112 may also store the data received at repository 110 using its own data format alongside the data format from legacy data protection system 104. In an embodiment, this may involve performing data compression and/or deduplication on the data as it arrives at repository 110. This may be particularly beneficial for generating reports since real-world differences between the two systems may be compared. For example, the data compression and/or deduplication differences between legacy data protection system 104 and data protection system 112 may be determined by comparing repository sizes. If one backup repository is smaller than the other backup repository, then the data protection system associated with the smaller backup repository may be preferable over the other data protection system. Storing the data using data protection system 112's format may also help convince a consumer that the migration is safe. Since the data may already be stored in data protection system 112's format, compatibility issues are no longer a problem.

In some embodiments, data protection system 112 may require specific agents, modules, applications, processes, probes, or daemons (collectively, "agents") to execute on client 100. These agents may communicate with data protection system 112 from the client and help coordinate the data protection process. Even in embodiments where these agents are not required, it may still be beneficial to install them on client 100. The agents could, for example, improve backup performance by providing client-side data deduplication.

Repository 110, data protection system 112, and/or some other computer process operating on repository 110 may install these agents on clients 100. In an embodiment, when repository 110 connects to a network it may push the agent to all of the clients in the environment, such as client 100. The agents may be configured to automatically install themselves on the client machine and communicate with data protection system 112. In an embodiment, this "push-install" may be similar to a computer virus spreading through a system. Additionally or alternatively, instructions may be transmitted to the clients to download the agent from an external source, such as a vendor website. The user and/or consumer IT department may also unilaterally install the agents on client devices.

In an embodiment, data protection system 112 may replicate itself through the consumers' system in a manner similar to the client agents. This may, for example, prevent data protection system 112 from consuming an inappropriate amount of resources on repository 110. Data protection system 112 may be assigned a resource threshold, and when that threshold is reached and/or exceeded the data protection system may discover and allocate additional resources to accommodate the additional workload. This threshold may exist, for example, because data protection system resides on a production repository and is not itself the primary data protection system (i.e. is not legacy data protection system 104). It may therefore by inefficient, inconvenient, and inappropriate for data protection system 112 to consume a large amount of resources. The threshold may comprise, for example, processing power, memory consumption, number of connections to data protection system 112, and/or network latency, among others. Once the threshold is exceeded, however, data protection system may replicate itself to other servers in the system. This replication process allows the data protection manager to operate in parallel on multiple servers in the system.

When data protection system 112 exceeds a threshold, it may attempt to discover additional servers in the system with available resources. These servers may be, for example, additional servers 108. Once a viable server is discovered, data protection system 112 may be replicated to that server and a new, server-specific threshold established. Additionally or alternatively, the old threshold may be reused. Data protection system 112 may operate on the new server until the threshold is again reached, at which point it may attempt to discover more servers and replicate itself again. This allows data protection system 112 to operate on multiple servers in the consumer environment, without consuming an inappropriate amount of resources.

In some embodiments, the propagation may occur only with a system administrator's consent. The administrator may grant the data protection system permission to virally install itself on servers in the environment. In some embodiments, the automatic deployment may be limited based on a policy. For example, the system administrator may define the maximum number of servers permitted to host the manager, and/or the maximum number of resources that may be consumed by that server.

While reference is made herein to data protection and/or backup services, virally replicating any type of service through an environment may be consistent with the present disclosure. For example, a web service application may be distributed through an environment when a number of connections is exceeded. Similarly, when a database is reaching full capacity it may discover additional locations with available storage space and virally deploy the required services to those locations. In some embodiments, any time a capacity to accomplish a service exceeds a threshold, regardless of what that service may be, additional resources may be discovered and allocated to the service. This may be based on a policy and at the consent of the system administrator.

Figure 2:
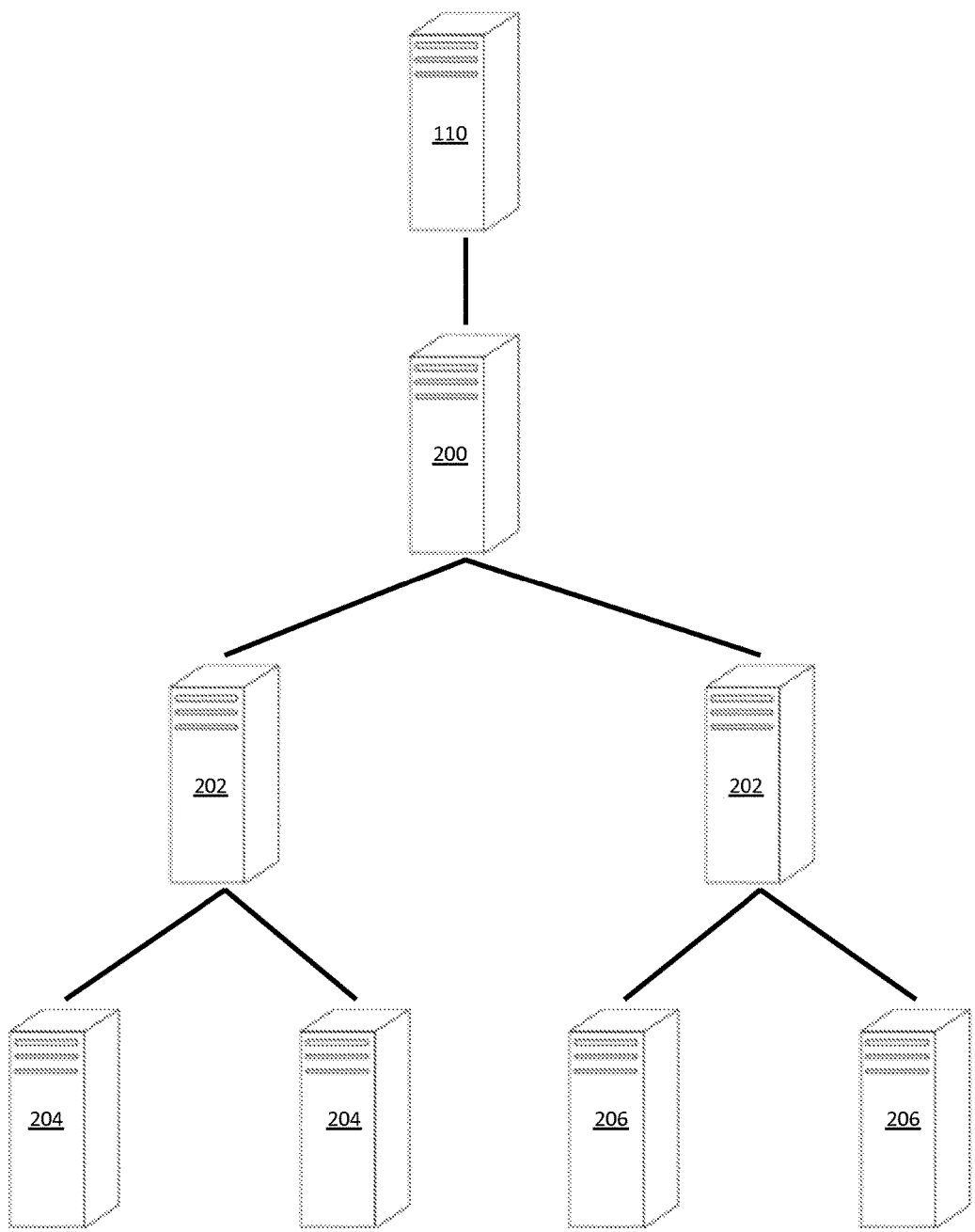
FIG. 2 illustrates a server tree for deployed data protection services consistent with an embodiment of the present disclosure.

FIG. 2 depicts an additional architecture for replicating data protection system 112 through a consumer system. In an embodiment, data protection system 112 may be immediately distributed to an available server, such as server 200, when repository 110 connects to the network. Alternatively, data protection system 112 may only be distributed after a threshold is met or exceeded. When it is ready to propagate again, data protection system 112 may replicate itself to computer servers 202 which may form child nodes to computer server 200. Similarly, when individual servers 202 exceed a threshold, data protection manager 112 may replicate itself to child nodes 204 and/or 206. This may form a tree structure with repository 110 and/or server 200 as the root node.

Having an individual server, such as repository 110 and/or server 200, serve as a root node may assist with system communications. A deployment status may be determined by communicating directly with the root node rather than all the individual servers in the system. Similarly, reports may be generated directly from the root node, which may communicate with the child nodes to retrieve the relevant information. Additionally, the tree structure allows the data protection system to be distributed to multiple locations in parallel. For example, nodes 202 may distribute the system to their respective children at the same time.

The tree structure may allow the additional workload to be performed in a coordinated fashion. Data protection tasks may distributed among the children nodes, and the results may be communicated to the parent node. Additionally or alternatively, the children nodes may each process the additional workload independently without communicating with each other.

In some embodiments, the tree structure depicted in FIG. 2 may dynamically grow or shrink based on need. For example, as the workload grows new compute resources may be needed. Adding more child nodes to the tree may allocate these new resources. If the workload starts to decrease, however, nodes may be removed from the tree. In an embodiment the nodes removed are leaf nodes. This allows the data protection system to dynamically expand and/or contract based on need.

Turning back to FIG. 1, the process described may result in a fully functioning data protection solution that is unique and independent from legacy system 104. Even if data protection system 112 only comprises a simulation, reports may be provided to the consumer and used to justify the expense to enable the functional data protection application. If the consumer determines that the new data protection system meets their needs and/or exceeds the capabilities of the legacy system, they may simply "turn off" the legacy system and start using the new data protection system 112. If the data was backed-up in parallel using data protection system 112's format, no further action may be required. The system is already installed on all the necessary machines and operating as expected. In other words, the consumer passively migrated to a new data protection system simply by installing a new backup repository and disabling the legacy backup system.

In some embodiments, the migration process may enable new data protection system 112 to access backups taken by legacy data protection system 104. Each of these data protection systems may maintain catalogs inventorying backups they have taken. Prior to shutting down legacy data protection system 104, new data protection system 112 may import the legacy data protection catalog into its own catalog. Should it become necessary to access a backup taken by legacy data protection system 104, the catalog stored in data protection 112 may be queried and the backup located. If data protection system 112 can process the legacy backup format, it may access and/or restore the backup. If data protection system 112 cannot process the backup format, legacy data protection system 104 may be re-enabled to access and/or restore the backup.

Figure 3:
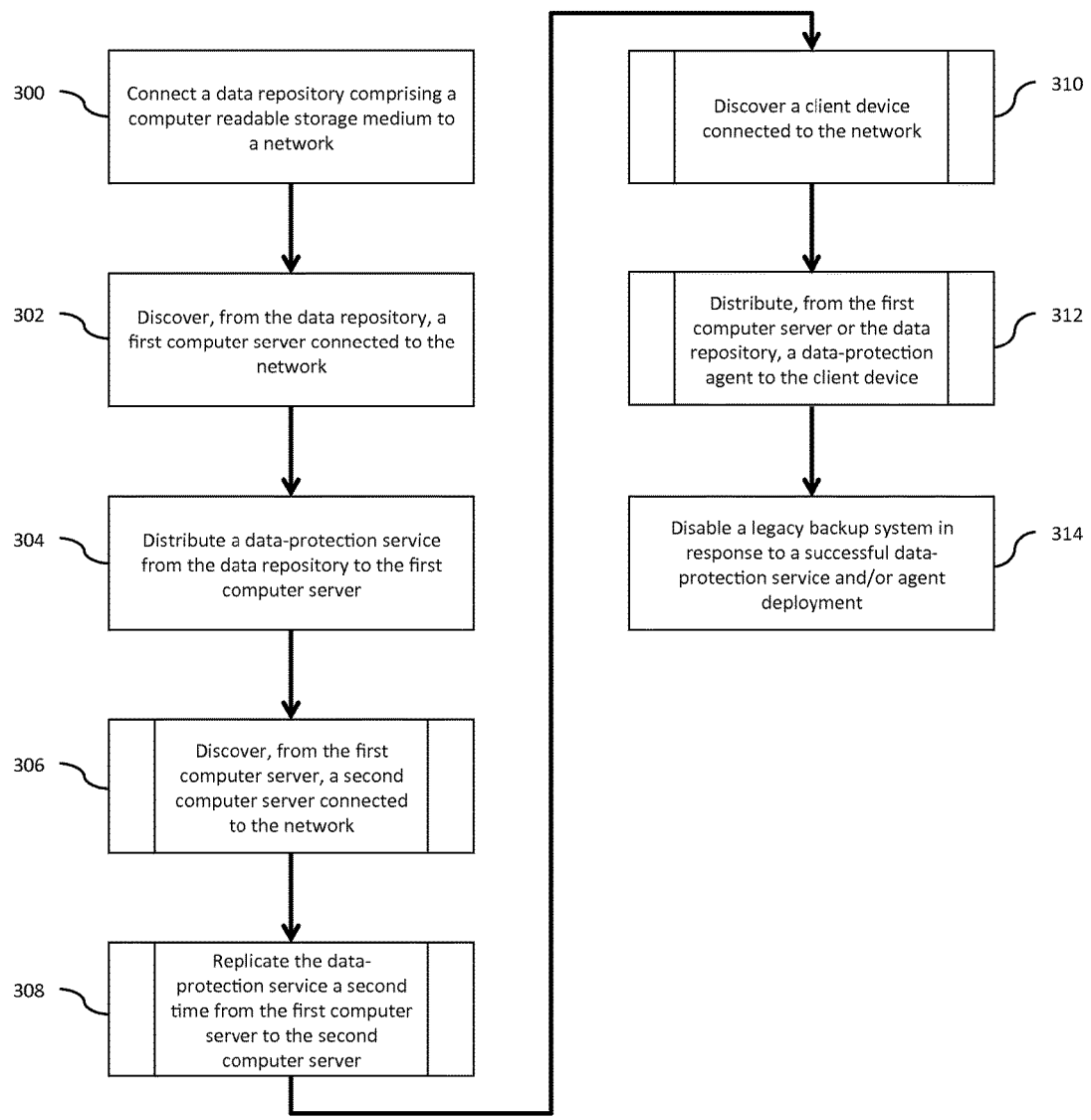
FIG. 3 is a flowchart illustrating a process for passive data protection tool migration consistent with an embodiment of the present disclosure.

Turning now to FIG. 3, a method for passively migrating to a new data protection system is discussed. At block 300, a data repository comprising a processor, memory, and/or computer readable storage medium is connected to a network. This may involve physically connecting the repository to the system, such as by plugging in a network cable, or electronically connecting the repository, such as by enabling software drivers associated with the physical network card. In some embodiments, the repository may be substantially similar to repository 110 and the network may be similar to network 102.

At 302, the data repository may attempt to discover a first computer server connected to the network. The repository could, for example, discover computing devices on the network and determine the operating environment on each. In an embodiment, the first computer server may be similar to additional computer servers 108 and/or computer server 200.

At block 304, a data protection service may be distributed from the data repository to the first computer server. The data protection service could be, for example, data protection system 112.

At 306, a second computer server may be discovered from the first computer server. Additionally or alternatively, the second computer server may be discovered from repository 110. The second computer server could be, for example, additional computer servers 108 and/or computer servers 202.

At 308, the data protection service may be transmitted a second time from the first computer server to the second computer server. This transmission could be, for example, in response to a threshold being exceeded on the first server.

At 310, a client device may be discovered on the network. This discovery process may be substantially similar to the computer server discovery process. In an embodiment, the discovery may occur at periodic intervals as new client devices may occasionally be added to the network.

At 312, a data protection agent may be distributed from the first computer server and/or data repository to the client device. This agent may, for example, be configured to manage the backup process from the client. In an embodiment, the client agent may make and/or maintain connections to the data protection service.

Finally, at block 314, a legacy data protection system may be disabled in response to a successful data protection service and/or client agent deployment. This legacy backup service may be, for example, legacy data protection service 104.

Figure 4:
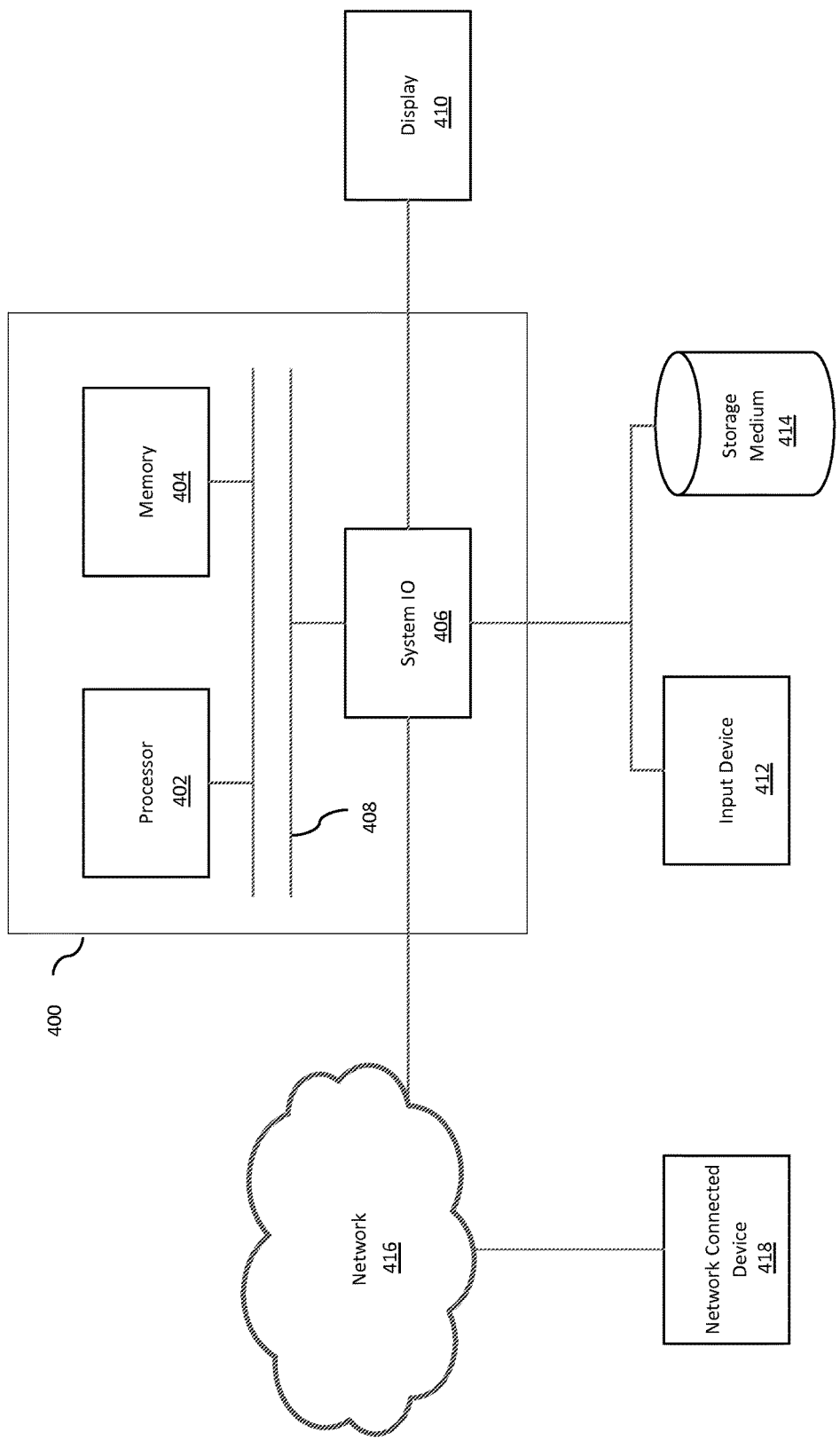
FIG. 4 is a general purpose computer system consistent with an embodiment of the present disclosure.

FIG. 4 depicts a computer system consistent with an embodiment of the present disclosure. General purpose computer 400 may include processor 402, memory 404, and system IO controller 406, all of which may be in communication over system bus 408. In an embodiment, processor 402 may be a central processing unit ("CPU") or accelerated processing unit ("APU"). Some embodiments may comprise multiple processors, or a processor with multiple cores. Processor 402 and memory 404 may together execute a computer process, such as the processes described herein, using input received from IO controller 406.

System IO controller 406 may be in communication with display 410, input device 412, non-transitory computer readable storage medium 414, and/or network 416. Display 410 may be any computer display, such as a monitor, a smart phone screen, or wearable electronics and/or it may be an input device such as a touch screen. Input device 412 may be a keyboard, mouse, track-pad, camera, microphone, or the like, and storage medium 414 may comprise a hard drive, flash drive, solid state drive, magnetic tape, magnetic disk, optical disk, or any other computer readable and/or writable medium. Storage device 414 may also reside inside general purpose computer 400, rather than outside as shown in FIG. 4.

General purpose computer 400 could be, for example, client 100, computer server 106, repository 110, additional computer servers 108, and/or computer servers 200, 202, 204, and/or 206.

Network 416 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 416 may be either wired or wireless or any combination thereof, and may provide input to or receive output from IO controller 406. In an embodiment, network 416 may be in communication with one or more network connected devices 418, such as another general purpose computer, smart phone, PDA, storage device, tablet computer, or any other device capable of connecting to a network. In an embodiment, network 116 may be substantially similar to network 102.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for passively migrating to a new data protection system, the method comprising:
   connecting a data repository comprising a computer readable storage device to a network;
   discovering, from the data repository, a first computer server connected to the network, wherein the first computer server comprises a legacy data protection service;
   distributing a data protection service from the data repository to the first computer server;
   discovering a second computer server and a third computer server connected to the network, wherein the data repository, the first computer server, the second computer server, and the third computer server form a tree structure; and
   distributing the data protection service a second time to both the second computer server and the third computer server when the first computer server reaches a resource threshold and when a maximum number of servers permitted to host the data protection service has not been reached, wherein the data protection service is distributed to the second computer server and the third computer server at the same time.

2. The method of claim 1, further comprising:
   discovering a client device connected to the network; and
   distributing a data protection agent to the client device.

3. The method of claim 2, wherein the data protection agent is distributed from the data repository.

4. The method of claim 2, wherein the data protection agent is distributed from the first computer server.

5. The method of claim 1, wherein the second computer server is discovered from the first computer server.

6. The method of claim 1, wherein the data protection service is distributed the second time from the second computer server.

7. The method of claim 1, further comprising disabling the legacy data protection service.

8. The method of claim 7, wherein disabling the legacy data protection service is in response to successful deployment of the data protection service.

9. A computer program product for passively migrating to a new data protection system, the computer program product comprising a non-transitory computer readable device having program instructions embodied therein for:
connecting a data repository comprising a computer readable storage medium to a network;
discovering, from the data repository, a first computer server connected to the network, wherein the first computer server comprises a legacy data protection service;
distributing a data protection service from the data repository to the first computer server;
discovering a second computer server and a third computer server connected to the network, wherein the data repository, the first computer server, the second computer server, and the third computer server form a tree structure; and
distributing the data protection service a second time to both the second computer server and the third computer server when the first computer server reaches a resource threshold and when a maximum number of servers permitted to host the data protection service has not been reached, wherein the data protection service is distributed to the second computer server and the third computer server at the same time.

10. The computer program product of claim 9, further comprising:
discovering a client device connected to the network; and
distributing a data protection agent to the client device.

11. The computer program product of claim 9, further comprising disabling the legacy data protection service.

12. A system for passively migrating to a new data protection system, the system comprising a processor configured to:
connect a data repository comprising a computer readable storage device to a network;
discover, from the data repository, a first computer server connected to the network, wherein the first computer server comprises a legacy data protection service;
distribute a data protection service from the data repository to the first computer server;
discover a second computer server and a third computer server connected to the network, wherein the data repository, the first computer server, the second computer server, and the third computer server form a tree structure; and
distribute the data protection service a second time to both the second computer server and the third computer server when the first computer server reaches a resource threshold and when a maximum number of servers permitted to host the data protection service has not been reached, wherein the data protection service is distributed to the second computer server and the third computer server at the same time.

13. The system of claim 12, further comprising:
discover a client device connected to the network; and
distribute a data protection agent to the client device.

14. The system of claim 12, further comprising disable the legacy data protection service.

* * * * *